United States Patent [19]

Iwase et al.

[11] Patent Number: 5,075,894

[45] Date of Patent: Dec. 24, 1991

[54] TELEPHONE MESSAGE FORWARDING APPARATUS

[75] Inventors: Sumio Iwase, Tokyo; Tadashi Yamamoto, Chiba, both of Japan

[73] Assignee: Sony Company, Tokyo, Japan

[21] Appl. No.: 114,452

[22] Filed: Oct. 28, 1987

[30] Foreign Application Priority Data

Nov. 6, 1986 [JP] Japan ............................ 61-264238
Nov. 6, 1986 [JP] Japan ............................ 61-264239

[51] Int. Cl.$^5$ .................... H04M 3/22; H04M 3/46
[52] U.S. Cl. .................................... 379/69; 379/73; 379/76; 379/386
[58] Field of Search ............ 379/67, 69, 88, 89, 379/92, 93, 97, 46

[56] References Cited

U.S. PATENT DOCUMENTS

| 4,160,125 | 7/1979 | Bower et al. ........................ 379/69 |
| 4,539,436 | 9/1985 | Theis ..................................... 379/92 |
| 4,616,110 | 10/1986 | Hashimoto ........................ 379/88 |
| 4,625,081 | 11/1986 | Lotito et al. . | |
| 4,640,991 | 2/1987 | Matthews et al. . | |
| 4,654,485 | 3/1987 | Yamamoto ..................... 379/76 X |
| 4,696,031 | 9/1987 | Freudberg et al. ............... 379/92 |

*Primary Examiner*—Stuart S. Levy
*Assistant Examiner*—Kenneth B. Wells
*Attorney, Agent, or Firm*—Philip M. Shaw, Jr.

[57] ABSTRACT

The invention discloses a telephone set and a method for its operation for storing a message and a telephone number of each telephone set to which a message is transferred, and reading out the telephone number to perform dialing for the destination telephone set. If a continuous period of silence is sent back from the destination telephone set for a predetermined time interval within a larger predetermined time interval after the connection is established, the telephone set reproduces the recorded message and sends it over the telephone lines to the destination set, otherwise the telephone set disconnects from the telephone line. The operation is automatically repeated for each designated destination telephone set, thereby automatically transferring the same message to a plurality of destination telephone sets.

6 Claims, 4 Drawing Sheets

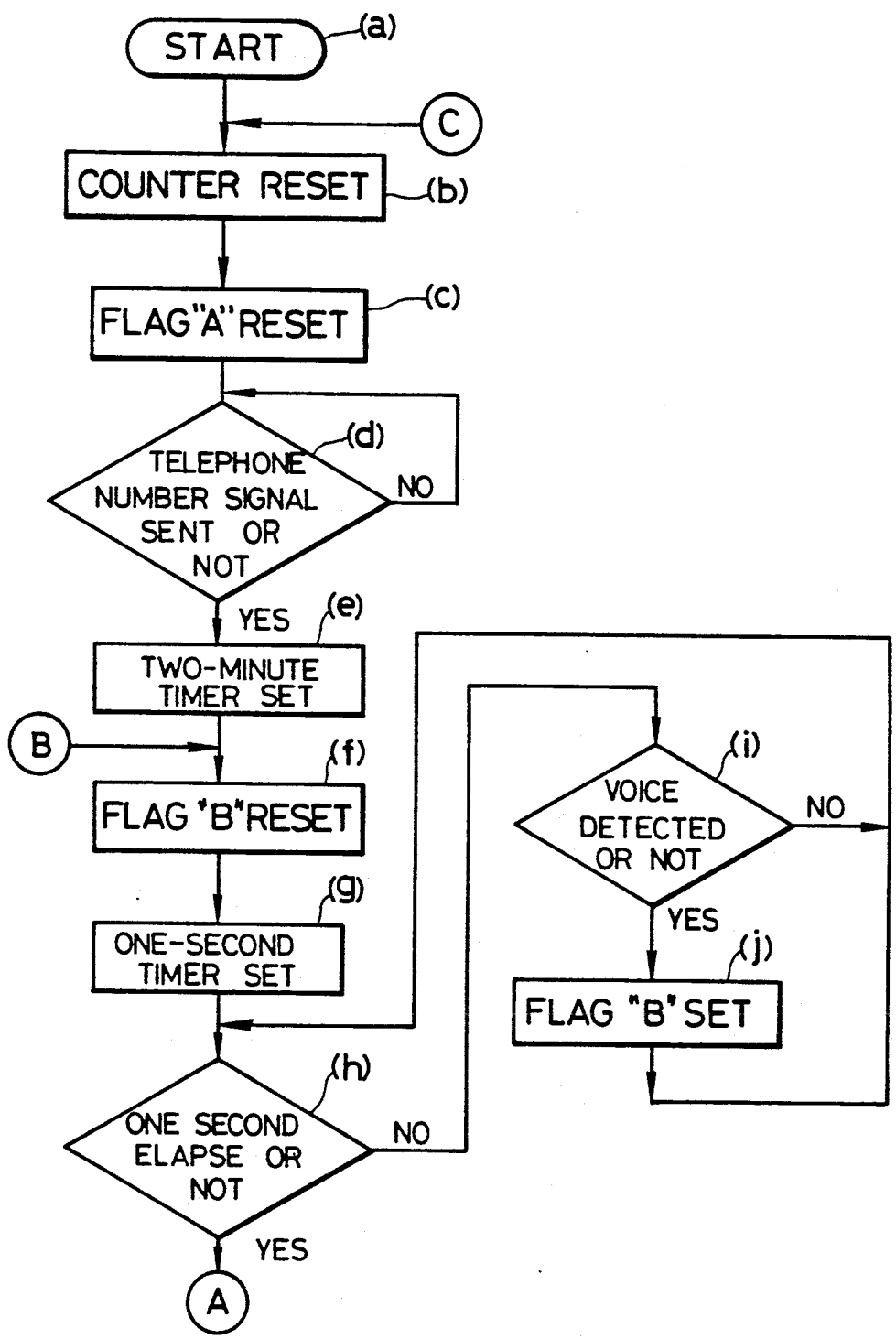

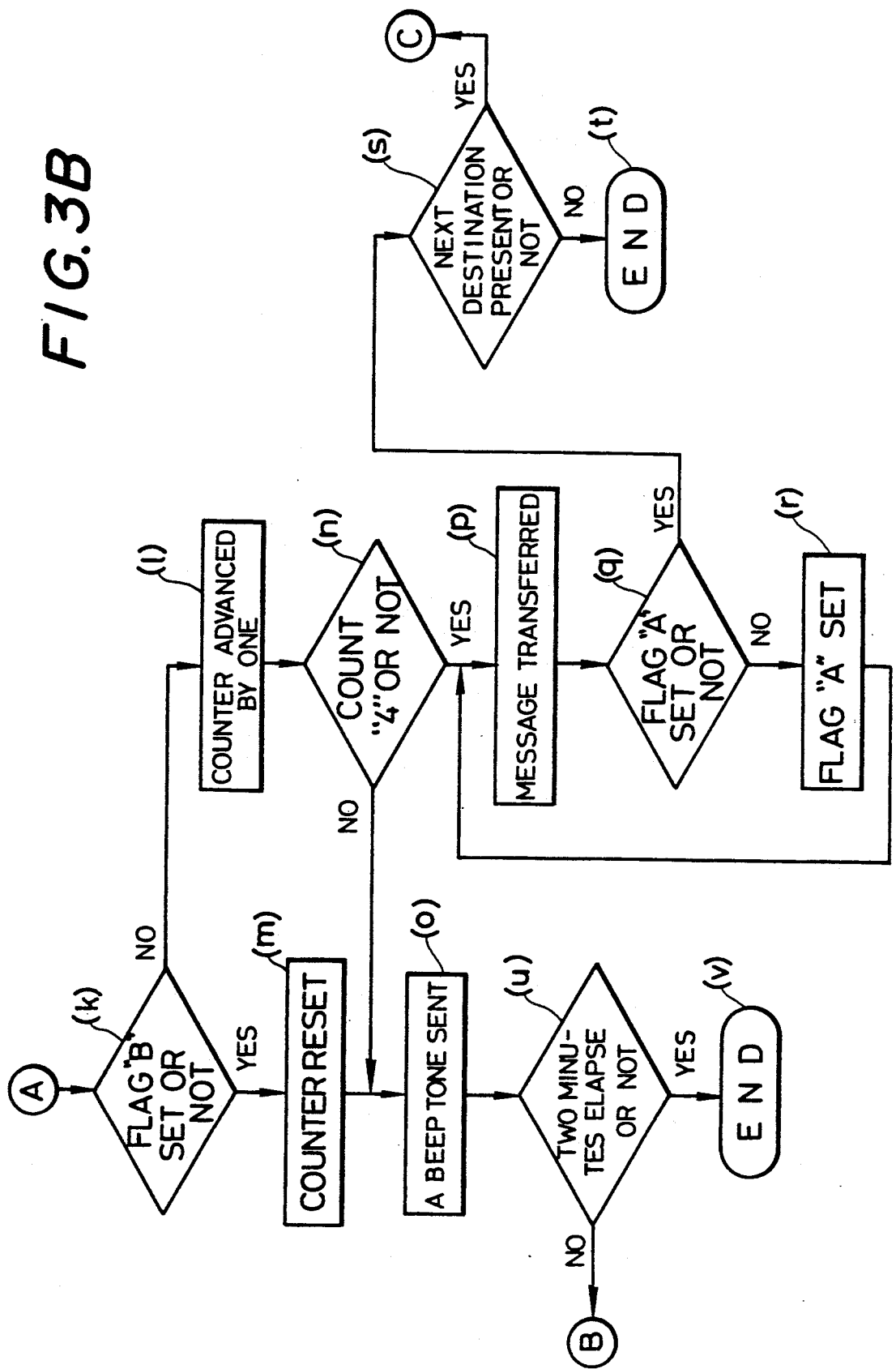

TELEPHONE MESSAGE FORWARDING APPARATUS

BACKGROUND OF THE INVENTION

1 Technical Field of the Invention

The present invention relates to a telephone set capable of transferring a recorded message to other telephone sets.

2. Description of the Prior Art

With a conventional telephone set, in order to send the same message to a plurality of persons, the user must manually dial the respective persons and speak the same message to each of them, which is a time consuming task. On the other hand, using a telephone set or an automatic telephone answering apparatus which includes a recording/reproducing unit and an automatic dialing unit, the same message may be recorded in the recording/reproducing unit, and the automatic dialing unit may automatically and sequentially call the respective persons, so that the same recorded message is reproduced and sent to each of them.

However, if a destination telephone set is switched to an automatic telephone answering apparatus, the types of destination automatic telephone answering apparatuses utilizable for this purpose are limited. This is because an automatic telephone answering apparatus of a certain type may not accept the message as an incoming message and hence will not record it. In addition, when the message recorded in the recording/reproducing unit is reproduced and sent to a destination telephone set so that a called party can listen to the message, the message must be reproduced after a remote control signal or a mode number for a remote operation is supplied from the destination telephone set so as to keep the privacy of the message. For this purpose, the called party must have an oscillator for the remote control signal or be able to input the mode number for each call using the ten keys of a push-button telephone.

SUMMARY OF THE INVENTION

It is an object of the present invention to provide a telephone set capable of automatically and sequentially sending the same message to a plurality of persons and capable of safely and reliably sending the same message to each destination telephone set without using a remote control signal or the like.

It is another object of the present invention to provide a telephone set capable of reliably communicating with a destination telephone set if the destination telephone set is set to an automatic telephone answering apparatus, and, in that case, regardless of the type of the automatic telephone answering apparatus, of sending the message and causing the destination telephone to record it.

It is still another object of the present invention to provide a telephone set which does not erroneously detect beep tones as a voice.

The foregoing and other objectives are achieved by the present invention of a telephone set for connection to the line of a telephone system and for automatically transferring a message from the telephone set to a destination telephone set, wherein the telephone set comprises recording and reproducing means for recording and reproducing a message, memory means for storing a telephone number of the destination telephone set to which said message recorded in said recording and reproducing means is to be automatically transferred, automatic dialing means for automatically dialing the desitnation telephone set using said telephone number stored in said memory means, detecting means for monitoring for a first predetermined time interval for signals sent from said destination telephone set through the telephone lines in response to dialing by said automatic dialing means, and message transfer means for reproducing said message recorded in said recording and reproducing means and sending said message to said destination telephone set through said telephone lines when no voice signal is continuously detected for a second predetermined time interval by said detecting means, wherein the first predetermined time interval exceeds and is inclusive of the second predetermined time interval.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 3A and 3B are a flow chart of a CPU.

DETAILED DESCRIPTION OF THE PREFERRED EMBODIMENT

Figure 1:
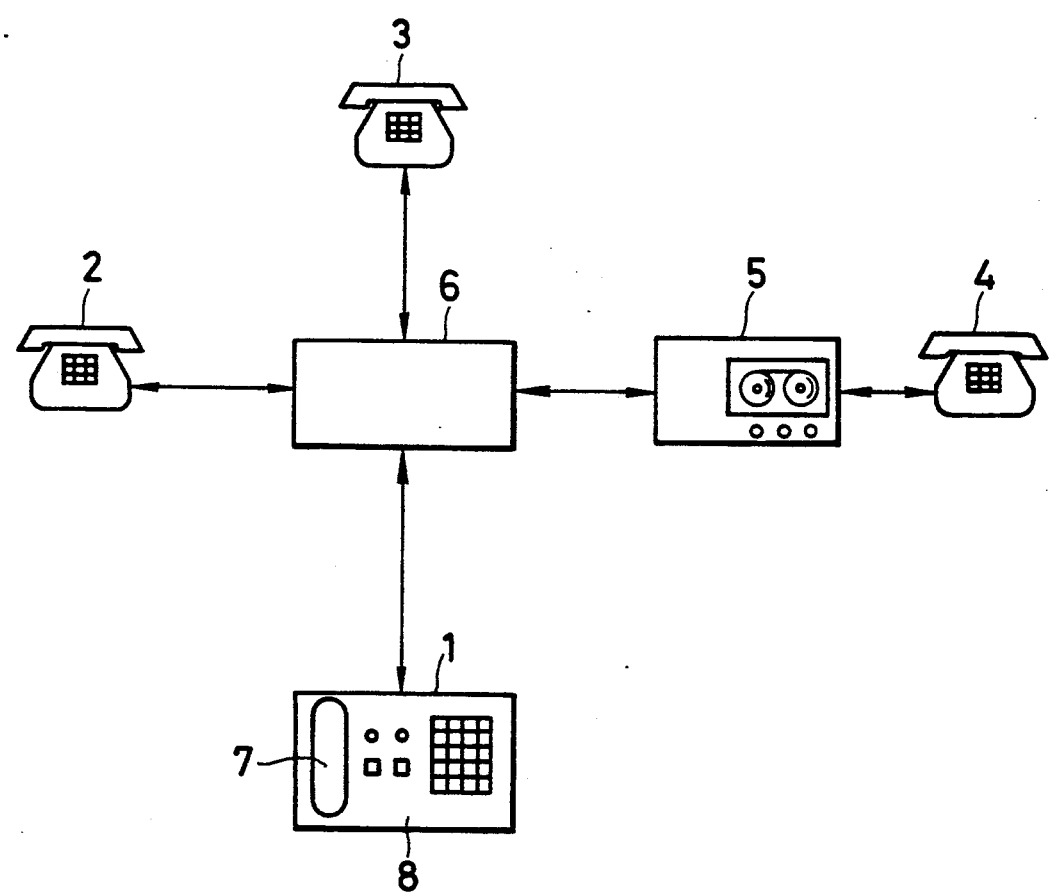
FIG. 1 is a block diagram of an embodiment of the present invention.

FIG. 1 shows a case wherein a telephone set 1 according to the present invention sequentially and automatically transfers a common message to a plurality of telephone sets, i.e., three telephone sets 2, 3, and 4. Note that the telephone set 4 has an automatic telephone answering apparatus 5, and the other telephone sets 2 and 3 are normal telephone sets without an automatic telephone answering function. The telephone sets 1 to 4 can communicate with each other through a telephone central office 6. The telephone set 1 has a handset 7 and a keyboard 8 including ten keys and operation buttons such as a message transfer start button.

Figure 2:
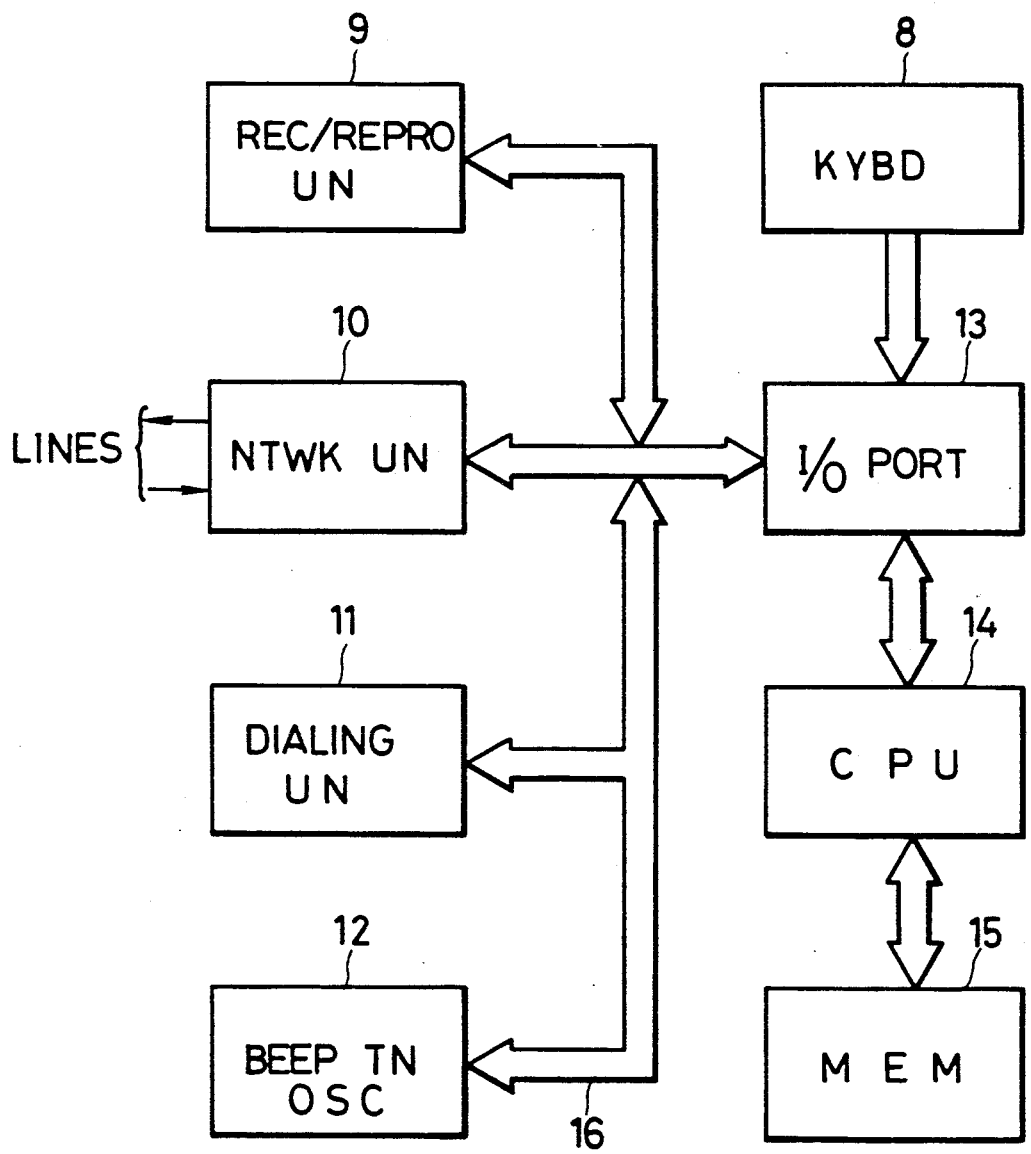
FIG. 2 is a block diagram of an embodiment of an internal circuit.

FIG. 2 is a block diagram of an internal circuit of the telephone set 1, in which the telephone set 1 includes the keyboard 8, a recording/reproducing unit 9, a network unit 10, a dialing unit 11, a beep tone oscillator 12, an I/O port 13, a CPU 14, and a digital memory 15. The units 9, 10, 11, and 12 are interconnected by a bus 16 to the I/O port 13, which is connected directly to the keyboard 8 and the CPU 14. The CPU 14 is directly connected to the digital memory 15.

A tape recorder which uses a magnetic tape or a solid-state memory is used as the recording/reproducing unit 9. Note that the telephone set 1 may have an automatic telephone answering function. In that case, the recording/reproducing unit 9 performs normal automatic recording, i.e., records/reproduces an outgoing message to a calling party and records/reproduces an incoming message therefrom.

A manipulation order and an operation will now be described with reference to a case wherein a common message is transferred from the telephone set 1 to the telephone sets 2, 3, and 4. Note that the operations, the timing of the operations, the mode switching, and the like of the units in the telephone set 1 are controlled by the CPU 14.

(A) First, selected ones of the ten keys of the keyboard 8 are manipulated by the user to cause the memory 15 to store the telephone numbers of the destination telephone sets 2, 3, and 4 and to cause the recording/reproducing unit 9 to store a message to be transferred.

(B) When either the keyboard's message transfer start button (not shown) is depressed or automatically, when the message to be transferred has been recorded in the recording/reproducing unit 9, a message transfer operation is started.

(C) During the message transfer operation, the network unit 10 is connected to telephone lines (LINES), and then the telephone number of the telephone set 2 is read out first from the memory 15. The dialing unit 11 automatically dials the number of the telephone set 2.

(D) As a result, ring back tones of the telephone set 2 are supplied to the telephone set 1 through the telephone lines.

(E) At this time, the telephone set 1 is set in a voice detection mode for detecting the presence or absence of a voice signal sent from the telephone set 2 through the telephone lines. Therefore, the ring back tones are detected.

(F) At the same time, signal tones, i.e., beep tones are sent from a beep tone oscillator 12 to the telephone lines through the network unit 10, e.g., once a second. These beep tones send information to the telephone set 2 representing that "a message is to be transferred from the telephone set 1 to the telephone set 2".

(G) In response to the call from the telephone set 1, a person at the message transfer destination picks up the handset of the telephone set 2 and says "Hello, this is Mr. so-and-so speaking." At this time, the person at the message transfer destination listens to the signal tones, i.e., the beep tones. If the person at the message transfer destination was informed beforehand that the signal tones represent that a message is to be transferred, the person keeps silent for a predetermined time interval, e.g., four seconds after listening to the beep tones. If the person at the message transfer destination does not know (or was not informed of) the meaning of the beep tones, the person does not keep silent for, e.g., four seconds but instead is likely to say something further, such as "Who is this, please" after "Hello, this is Mr. so-and-so speaking". This causes the telephone set 1 to disengage from the lines without detecting a silent interval, and the message transfer operation of the message with respect to the telephone set 2 is interrupted (as will be explained further at paragraph (J)).

(H) Assuming the telephone set 1 detects the ring back tones and "Hello, this is Mr. so-and-so speaking" as a voice signal, and subsequently detects the silent interval of four seconds, the telephone set 1 determines that the person at the message transfer destination has picked up the handset of the telephone set 2 and is waiting for the message.

(I) The recording/reproducing unit 9 is set by the CPU 14 to be in a reproducing mode to reproduce a message to be transferred and sends it to the telephone set 2 through the network unit 10 and the telephone lines. The reproduced message is transferred several times, e.g., twice so that the person at the message transfer destination can completely listen to and understand the mssage.

(J) After the message is transferred, the CPU 14 causes the telephone set 1 to be disconnected from the telephone set 2. Then, the telephone number of the telephone set 3 is read out from the memory, the dialing unit 11 automatically performs dialing with respect to the telephone set 3 on the basis of the readout telephone number, and the operation of steps (C) to (I) is performed again.

Note that in the steps (G) and (H), the silent interval is detected when the person at the message transfer destination keeps silent for four seconds. In this case, the signal tones, i.e., the beep tones are generated from the telephone set 1 in this silent interval. Therefore, even if the person at the message transfer destination keeps silent for four seconds or more, the silent interval is not detected when these signal tones are erroneously detected as a voice signal from the telephone set 2 by the telephone set 1.

For this reason, in this embodiment, the detection of the silent interval by the telephone set 1 is interrupted once a second, every time the beep tone is generated from the telephone set 1, so that the beep tones are not erroneously detected by the telephone set 1. The presence or absence of a voice signal between the respective beep tones is detected by the telephone set 1 and if any voice signal is not detected in four sequential detection periods, the telephone set 1 determines that a silent interval has been detected.

When the person at the message transfer destination is out or the line thereof is busy, ring back tones or busy tones are continuously detected by the telephone set 1 for a long time period, and hence the silent interval is not detected. In this case, for example, voice detection is performed for two minutes, and if the silent interval of four seconds is not detected during this voice detection interval, the message transfer operation of the mesaqe is determined to be impossible since this condition would indicate that the person at the message transfer destination is out or the line thereof is busy and hence the message transfer of the message is interrupted. Note that the message transfer operation may be automatically performed with respect to the telephone set 2 again several times, e.g., in one or two hours after this interruption. Alternatively, after this interruption dialing to the telephone set 3 may commence immediately to perform the message transfer operation thereto.

After the message transfer operations with respect to the telephone sets 2 and 3 are performed as described above, the message transfer operation with respect to the next telephone set 4 is started, and the operation of steps (C) to (F) is performed.

(K) If at the time telephone set 4 is called, a person picks up the handset of the telephone set 4, the operation of steps (G) to (J) are performed, thereby transferring the message to the telephone set 4 in the same manner as described above.

(L) If, however, the person to be called is out, an automatic telephone answering apparatus 5 answers the call. When a normal automatic telephone answering apparatus receives an incoming message from a telephone set, it engages the telephone lines, reproduces an outgoing message prerecorded in a magnetic tape or a solid-state memory, and informs the calling party that any incoming message will be automatically recorded "at the sound of the beep." In this case, when reproduction of the outgoing message is completed, a signal tone, i.e., a beep tone is sent to the calling party to inform the calling party that "you may record an incoming message", and at the same time, the automatic telephone answering apparatus 5 is set in a recording mode for recording the incoming message from the calling party. Thereafter, an incoming message from the calling party is recorded in the magnetic tape or the solid-state memory. Alternatively, in the automatic telephone answering apparatus 5, an already recorded portion of the magnetic tape is wound up at a high speed before the apparatus sends a beep tone to the calling party, and then the apparatus is set in a recording mode. During this winding up at the high speed, signal tones such as chime tones are sent to the calling party.

(M) Therefore, if the person at the message transfer destination is out, the ring back tones are first detected by the voice detection in the step (E), and then the outgoing message and the beep tone are detected as voice signals. Thereafter, the automatic telephone answering apparatus 5 is set in the recording mode for recording the incoming message from the calling party. In this time, the automatic telephone answering apparatus 5 does not send any tone to the calling party, i.e., is set in the silent state. If this silent state (recording mode) continues for more than four seconds, the telephone set 1 determines that the message may be transferred to the automatic telephone answering apparatus 5, as in the step (H).

(N) Therefore, the operation of the steps (I) and (J) is immediately performed to transfer the message, and the transferred message is recorded as an incoming essage in the magnetic tape or the solid-state memory of the automatic telephone answering apparatus 5 which is set in the recording mode for recording the incoming message.

According to the operation, the common message to be transferred can be sequentially transferred from the telephone set 1 to the telephone sets 2, 3, and 4. In the case of a telephone set 4 having an automatic telephone answering apparatus 5, if the called party of the telephone set 4 is out, the message to be transferred can be recorded as an incoming message by the automatic telephone answering apparatus 5.

In addition, the telephone set 1 determines whether the message may be transferred, by detecting a silent interval for a predetermined time interval, e.g., four seconds. Therefore, the message can be transferred to the normal telephone sets 2, 3, and 4 regardless of the type of the automatic telephone answering apparatus 5.

Furthermore, if a person answering the phone does not know the meaning of the signal tones, i.e., the beep tones indicating that a message is to be transferred or that a silent interval of four seconds is required, i.e., a person other than a specified person answers the phone, the message is not transferred. Therefore, the message is not likely to be heard by a person other than the intended recipient.

It is a matter of course that the number of the destination telephone sets 2, 3, and 4 may be arbitrarily increased or decreased. In addition, a message transfer code may be determined between a plurality of destinations, and the message may be transferred after this code is sent. However, in that case, the types of destination telephone sets and the destination automatic telephone answering apparatuses are limited. In this embodiment, since a silent interval of a predetermined time, e.g., four seconds is detected, the message can be transferred to any telephone set and any automatic telephone answering apparatus.

Furthermore, the signal tones, i.e., the beep tones are sent before the message is transferred. In this case, in order to prevent the beep tones from being erroneously detected as a voice signal from the called party by the telephone set 1, the detection of the silent interval by the telephone set 1 is interrupted every time the beep tone is generated. Therefore, the silent interval can be detected more reliably. In the embodiment, according to the operation of steps (A) and (B), recording of the message to be transferred, input of the telephone numbers of the destination telephone sets, manipulation of the message transfer start button, and the like are directly manipulated at the telephone set 1. However, the telephone set 1 may be accessed by a telephone set located at a remote place where a user is present, and a remote control signal or a message to be transferred may be sent by the user upon manipulation of the keys of a special transmitter or the telephone set located at the remote place, e.g. telephone set 2, thereby controlling the telephone set 1 from the remote place where the user is present to execute the operation of steps (A) and (B). That is, the user can execute the message transfer operation even if he or she is not near the telephone set 1.

FIGS. 3A and 3B show a flow chart of part of the routine used by the CPU 14 for performing the above described message transfer operation.

In FIG. 3A, when the message transfer start button is depressed and the message transfer operation is started in step (a), a counter for counting a silent interval is reset in step (b). Then, a flag A representing message transfer completion is reset in step (c), and the CPU 14 checks in step (d) whether a signal representing a first destination telephone number has been sent. If "YES" in step (d), a two-minute timer for detecting the absence of a called party is set in step (e). Then, a flag B representing that a voice is detected is reset in step (f), and a one-second timer for sending the signal tones, i.e., the beep tones once a second is set in step (g). In step (h), the CPU 14 waits for one second which is an interval between the respective beep tones. Then, the CPU 14 checks in step (i) whether a voice from the destination is detected in this one-second interval. If "YES" in step (i), the flag B is set in step (j), and then the flow returns to step (h). If "NO" in step (i), the flow directly returns to step (h).

When one second has passed in step (h), as shown in FIG. 3B, the flow advances to step (k), and the CPU 14 checks the presence or absence of a voice signal (step (i)) in accordance with the presence or absence of the flag B. If "YES" in step (k), the counter reset in step (b) is advanced by one in step (l). If "NO" in step (k), the counter is reset in step (m).

When the counter is advanced by one in step (l), the CPU 14 checks in step (n) whether its count has reahed "4". If "NO" in step (n), the flow advances to step (o). If the counter is reset in step (m), the flow also advances to step (o). In step (o), a beep tone is generated only once.

Therefore, according to the routine consisting of steps (h) - (i) - (j) - (h) of FIG. 3A, the presence or absence of a voice is detected within one second between a beep tone and the next beep tone. If a voice is detected, the counter is advanced and then a beep tone is generated once again. If no voice is detected, the counter is reset and then a beep tone is generated once again. That is, since the voice detection is performed only within one second between the respective beep tones, the beep tones are substantially muted as to the voice detection as described above.

In FIG. 3B, when voices are sequentially detected four times in step (n) during the voice detection performed in units of seconds, the flow advances to step (p)

to transfer the message. When the first message transfer operation is completed, the CPU 14 checks in step (g) the presence or absence of the flag A which is reset in step (c). In this case, since the flag A has been reset, the flag A is set in step (r), and the flow returns to step (p) to perform a second message transfer operation (this is because the same message is repeatedly transferred twice in this embodiment). When the second message transfer operation is completed, the flow advances from step (q) to (s) sinoe the flag A has already been set. In step (s), the CPU 14 checks whether the next destination is stored in the memory. If "NO" in step (s), the flow advances to step (t) and the operation is ended. If "YES" in step (s), the flow returns to step (b), and the above operation is repeated.

In the above operation, the two-minute timer which is set in step (e) is checked in step (u) every time the beep tone is sent in step (o). When two minutes have passed before the count of the counter reaches "4", the CPU 14 determines that the called party is not present and ends the operation in step (v). The operation from step (f) is repeatedly performed before two minutes have passed in step (u).

According to the present invention, the same message can be automatically and sequentially transferred to a plurality of persons, thereby avoiding the trouble of manually making telephone calls to the respective persons in a conventional manner. In addition, the types of destination telephone sets and destination automatic telephone answering apparatuses are not limited but may be conventional ones. Furthermore, if the present invention is applied to an automatic telephone answering apparatus, the hardware of the automatic telephone answering apparatus can be sufficiently utilized so that the cost is not much increased.

Although the present invention has been shown and described with respect to preferred embodiments, various changes and modifications which are obvious to a person skilled in the art to which the invention pertains are deemed to lie within the spirit and scope of the invention.

What is claimed is:

1. A telephone set for connection to the line of a telephone system and for automatically transferring a message from the telephone set to a destination telephone set, the telephone set comprising:
   recording and reproducing means for recording and reproducing a message;
      memory means for storing a telephone number of the destination telephone set to which said message recorded in said recording and reproducing means is to be automatically transferred;
      automatic dialing means for automatically dialing the destination telephone set using said telephone number stored in said memory means;
      detecting means for monitoring for a first predetermined time interval for signals sent from said destination telephone set through the telephone lines in response to dialing by said automatic dialing means; and
   meassage transfer means for reproducing said message recorded in said recording and reproducing means and sending said message to said destination telephone set through said telephone lines when no voice signal is continuously detected for a second predetermined time interval by said detecting means, wherein the first predetermined time interval exceeds and is inclusive of the second predetermined time interval, and wherein said message transfer means repeatedly reproduces and sends said message a plurality of times during a single call.

2. A telephone set for connection to the line of a telphone ssytem and for automatically transferring a message from the telehpone set to a destination telephone set, the telephone set comprising:
   recording and reproducing means for recoding and reproducing a message;
   memory means for storing a telephone number of the destination telephone set to which said message recorded in said recording and reproducing means is to be automatically transferred;
   automatic dialing means for automatically dialing the destination telephone set using said telephone number stored in said memory means;
   beep tones sending means for generating beep tones, having a predetermined period, after dialing of said automatic dialing means and sending said beep tones to said destination telephone set through said telehpone lines;
   detecting means for detecting a voice signal sent from said destination telephone set through the telephone lines in response to dialing by said automatic dialing means;
   muting means for interrupting the detection by said detecting means so that said beep tones are not detected by said detecting means;
   message transfer means for reproducing said message recorded in said recording and reproducing means and sending said message to said destination telephone set through said telephone lines when no voice signal is detected for a predetermined time interval by said detecting means.

3. A telephone set according to claim 2, wherein said muting means is activated in synchronism with said beep tones at each predetermined period.

4. A method for automatically transferring a message from one telephone set to a destination telephone set, the message transfer method comprising the steps of:
   recording and reproducing a message;
   storing a telephone number of the destination telephone set to which said recorded message is to be automatically transferred;
   automatically dialing the destination telephone set using said stored telephone number;
   monitoring the telephone lines for a first predetermined time interval for signals sent from said destination telephone set through the telephone lines in response to the automatic dialing; and
   repeatedly reproducing and sending said recorded message a plurality of times during a single call to said destination telephone set through said telephone lines when no voice signal is detected for a second predetermined time interval during the monitoring of the telephone lines in the first predetermined time interval.

5. A method for automatically transferring a message from one telephone set to a destination telephone set, the message transfer method comprising the steps of:
   recording and reproducing a message; storing a telephone number of the destination telephone set to which said recorded message is to be automatically transferred;
   automatically dialing the destination telephone set using said stored telephone number;

detecting a voice signal sent from said destination telephone set through the telephone lines in response to the automatic dialing;

generating beep tones, having a predetermined period, after dialing of said destination telephone set and sending said beep tones to said destination telephone set through asid telephone lines;

interrupting the detection step so that said beep tones are not detected; and reproducing said recorded message and sending said message to said destination telephone set through said telephone lines when no voice signal is detected for a predetermined time interval.

6. A message forwarding method according to claim 5, wherein said interrupting step occurs in synchronism with said beep tones at each predetermined period.

* * * * *